United States Patent
Kim et al.

(10) Patent No.: US 7,648,797 B2
(45) Date of Patent: Jan. 19, 2010

(54) UNIFICATION TYPE CAP ASSEMBLY CONTAINING PROTECTION CIRCUIT BOARD AND SECONDARY BATTERY COMPRISING THE SAME

(75) Inventors: Hyungchan Kim, Seoul (KR); Hee gyu Kim, Seoul (KR); Yong-ho Cho, Yongin-si (KR); Jae sik Chung, Seoul (KR)

(73) Assignee: LG Chem, Ltd., Seoul (KR)

( * ) Notice: Subject to any disclaimer, the term of this patent is extended or adjusted under 35 U.S.C. 154(b) by 174 days.

(21) Appl. No.: 11/058,605

(22) Filed: Feb. 16, 2005

(65) Prior Publication Data
US 2005/0214597 A1 Sep. 29, 2005

(30) Foreign Application Priority Data
Feb. 18, 2004 (KR) .................. 10-2004-0010693

(51) Int. Cl.
*H01M 2/00* (2006.01)
(52) U.S. Cl. ................ 429/163; 429/167; 429/138; 429/89; 429/165
(58) Field of Classification Search ................ 429/163, 429/167, 138, 89, 185, 165
See application file for complete search history.

(56) References Cited

U.S. PATENT DOCUMENTS

| | | | |
|---|---|---|---|
| 6,157,545 A | * | 12/2000 | Janninck et al. ............. 361/814 |
| 2003/0003357 A1 | * | 1/2003 | Tamai et al. ................. 429/181 |
| 2003/0108780 A1 | * | 6/2003 | Iwaizono et al. ............... 429/7 |
| 2003/0180582 A1 | * | 9/2003 | Masumoto et al. ............. 429/7 |
| 2004/0241541 A1 | * | 12/2004 | Watanabe et al. ........... 429/163 |

* cited by examiner

Primary Examiner—Patrick Ryan
Assistant Examiner—Ben Lewis
(74) Attorney, Agent, or Firm—Birch, Stewart, Kolasch & Birch, LLP

(57) ABSTRACT

An integral cap assembly comprising a top cap mounted as a base plate to an opening of a battery can and a cap subassembly including a protective circuit module and the like integrally mounted on the top cap, a method for manufacturing a secondary battery comprising the same, and a secondary battery manufactured thereby are disclosed. The cap assembly is provided as an integral member comprising the top cap acting as the base plate, and the cap subassembly having the protective circuit module provided thereon, thereby simplifying a manufacturing process of the battery while minimizing frequency of defective products. Additionally, the integral cap assembly is manufactured through insert injection molding, thereby providing notable advantages over the conventional technology.

11 Claims, 17 Drawing Sheets

*Prior Art*

Prior Art

*Prior Art*

*Prior Art*

*Prior Art*

Prior Art

UNIFICATION TYPE CAP ASSEMBLY CONTAINING PROTECTION CIRCUIT BOARD AND SECONDARY BATTERY COMPRISING THE SAME

FIELD OF THE INVENTION

The present invention relates to an integral cap assembly for a battery, and a secondary battery comprising the same, and, more particularly, to an integral cap assembly, which comprises a top cap mounted as a base plate to an opening of the upper end of a battery can, and a cap subassembly including a protective circuit module and the like integrally mounted on the top cap, a method for manufacturing a secondary battery comprising the same, and a secondary battery manufactured thereby.

BACKGROUND OF THE INVENTION

A rechargeable secondary battery is generally classified into hard cap batteries and internal batteries. FIG. 1 shows a representative example of the hard cap battery. Referring to FIG. 1, a hard cap battery 10 is provided as a detachable part of a device 12, and thus has an advantage of convenience in mounting of the battery to the device 12. However, since the hard cap battery 10 requires a case (housing) 11 that serves to house a battery body embedded therein and is designed to have a shape according to a kind of an associated device, it has problems of higher price and incompatibility.

On the other hand, since an internal battery 20 is used in a state of being embedded within the device and covered by a case constituting a part of the device, as shown in FIG. 2, it has advantages of lower prices and compatibility in spite of its inconvenience in mounting of the battery to the device.

FIGS. 3 and 4 show the detailed construction of the internal battery. Referring to FIGS. 3 and 4, the internal battery 20 comprises: a battery body 21 that is provided, for example, at one side with a cathode terminal and at the other side with an anode terminal; a protective circuit (PTC) element 22 connected to one of the terminals of the battery body 21 to primarily protect the battery from over-current, over-discharge, and over-charge; a protective circuit module 24 connected to the terminal connected to the PTC element 22 through a nickel plate 23 and to the other terminal of the battery body through a nickel plate 27 to secondarily protect the battery, the protective circuit module 24 including outer input and output terminals formed on an outer surface of the protective circuit module 24 for allowing an associated device (not shown) to be connected to the protective circuit module 24; upper and lower cases 25 and 26 enclosing the battery body 21, the PTC element 22, and the protective circuit module 24.

Insulating sheets 28 are disposed between a side surface of the battery body 21 and the nickel plate 23, and between the protective circuit module 24 and the nickel plate 27, and thus prevent shorting due to unnecessary contact between the respective nickel plates 23 and 27 and adjacent battery body 21 or the protective circuit module 24.

Additionally, a double-sided adhesive tape is disposed between the battery body 21 and the lower case 26, allowing the battery body 21 to be intimately fixed to the bottom surface of the lower case 26. Accordingly, when the battery body 21 is received within the upper and lower cases 25 and 26, it can be stably fixed within the cases 25 and 26.

In order to manufacture the battery as described above, after a battery assembly is inserted into a battery can 30, a cap 31 is mounted on an opening of the can 30, and coupled thereto by laser welding around a contact portion between the cap and the opening. Then, an electrolyte is injected into the can 30 through an injection port 32 formed at one side of the cap 31.

However, the secondary battery constructed as described above has some problems.

First, there is an increasing demand for a smaller and lighter battery as a result of miniaturization and compactness of devices, and thus it is necessary to manufacture a case corresponding to such a battery through an ultra-precise thin film injection molding, which has a technological difficulty and results in an increase of manufacturing costs.

Second, the secondary battery requires a number of processes for mounting the PTC element, the nickel plates, the protective circuit module, the upper and lower cases, and the like, and is difficult to assemble, thereby providing high frequency of defective products and increasing the manufacturing costs.

Third, since the upper and lower cases are mainly welded to each other through supersonic welding, it is necessary for the pack to have a predetermined thickness or more for the supersonic welding, which becomes a factor of impedance to the miniaturization and compactness of the battery. Further, since minute movement of the upper and lower cases occurs during the supersonic welding, defectiveness of the products is high, and constant operator management is necessary.

As for an approach for solving the problems as described above, an approach has been suggested, in which a number of components (that is, a cap assembly) mounted on the upper end of the battery body is insert injection molded together with the battery body. FIGS. 5 to 7 is a diagram illustrating such an insert injection molding method, a front view and a side view illustrating a secondary battery manufactured by the method, respectively.

Referring to FIGS. 5 to 7, the battery 20 is manufactured in such a manner that, with a connection terminal 50 at the side of the protective circuit module 24 being connected to a lid 51 at the side of the battery body 21, the protective circuit module 24 and the battery body 24 of the battery 20 are integrally fixed to each other within a molding space 40 of a mold 43 comprising an upper mold 41 and a lower mold 42 by means of a molten resin (not shown) injected through an injection port 44 of the upper mold 41.

Such an insert injection molding method for manufacturing the battery 20 does not requires the upper and lower cases, and thus has an advantage of reducing the dimensions (in particular, the thickness) of the battery. However, since a cap assembly 60 is molded integrally with the battery body 21 within the mold 40, this method has several problems as follows.

First, since the battery body 21 and the protective circuit module 24 are fixed within the molding space 43 by the molten resin in a state wherein a circuit is operated by positioning the battery body 21 containing an electrode assembly together with the protective circuit module 24 within the molding space 43 of the mold 40, there is a high possibility of short due to contact of the battery body 21 and the protective circuit module 24 to the mold 40 while they are integrally fixed within the mold 24. Accordingly, since the battery body 21 and the protective circuit module 24 constitute the circuit with power applied thereto, there is inconvenience in that the output terminal must be coated in order to prevent electrical short.

Second, if the battery body 21 is deformed due to pressure applied thereto according to the size of the battery body 21 or if the molten resin having a high temperature and a high pressure is injected into the molding space 43 while coupling the upper mold 41 and the lower mold 42 with the battery body 21 temporarily joined to the protective circuit module 24 within the molding space 43 of the mold 40, misalignment between the battery body 21 and the protective circuit module can easily occur during the injection of the molten resin into the molding space 43, thereby increasing the frequency of defective products.

Third, if the battery body 21 has a high temperature within the molding space 40, the battery can be susceptible to change in electrical characteristics and be subjected to a danger of explosion. Additionally, in the event when a pressure is applied to the battery can constituting the battery body 21 within the mold 40, the pressure can be applied to the portion where the battery can and the cap are welded to each other, thereby creating an un-welded portion.

Accordingly, the internal battery has several problems, such as movement of the internal components due to the injection molding together with the battery body 21, instability of the contact surface of the battery body 21 and the resinous molding portion, and dimensional preciseness of the battery body 21 for allowing the battery body 21 to be inserted into the mold 40, and the like.

SUMMARY OF THE INVENTION

Therefore, the present invention has been made in view of the above problems, and it is an object of the present invention to provide an integral cap assembly, which comprises a top cap mounted as a base plate to an opening of the upper end of a battery can, and a cap subassembly including a protective circuit module and the like integrally mounted on the top cap, thereby allowing easy manufacturing of a battery while remarkably reducing the frequency of defective products.

It is another object of the invention to provide a method of manufacturing a battery through a simple assembly using the cap assembly.

It is yet another object of the invention to provide a secondary battery manufactured by the method.

In accordance with one aspect of the present invention, the above and other objects can be accomplished by the provision of an integral cap assembly, comprising: a top cap mounted as a base plate to an opening of a battery can; and a cap subassembly including a protective circuit module integrally mounted on the top cap.

The cap assembly of the invention is provided as an independent member, and characterized in that the cap subassembly comprising the protective circuit module, and a cap housing are integrally mounted on the top cap. Accordingly, the battery can be easily manufactured by inserting an electrode assembly comprising a cathode, a separator and an anode into the battery can, and mounting the cap assembly of the invention on the opening of the battery can. As such, the cap assembly provided as the independent member, which comprises the cap subassembly integrally mounted on the top cap acting as the base plate, is novel.

Here, the term "cap subassembly" means all components mounted on the top cap while constituting an upper portion of the battery, and may comprise, for example, a protective circuit module for preventing over-current, over-discharge, and over-charge of the battery, a cap housing for covering an outer surface of the protective board, and the like. Optionally, the cap subassembly may comprise an electrode lid for electrical connection, an insulating member for preventing electrical short, and safety elements including, a PTC element, a bimetal, a fuse, etc.

The integration of the top cap (base plate) and the cap subassembly may be variously achieved through fastening, bonding, forming, and the like. Most preferably, the cap subassembly is integrally coupled to the top cap in a state of being electrically connected to the top cap within a mold by insert injection molding.

More specifically, the integral cap assembly may be manufactured by inserting the cap subassembly as an insert within a mold, in which the cap subassembly is mounted on one surface of the top cap including two electrode terminals such that the protective circuit module is electrically connected to the two electrode terminals of the top cap, and then insert injection molding with a molten resin such that the other side of the top cap is exposed to the outside of the resin within the mold.

As such, the manufacture of the cap assembly through the insert injection molding can be performed by molding the cap assembly in a state wherein the protective circuit module is not electrically connected to the battery body, that is, in a state wherein the protective circuit module is mounted on the top cap having the two electrodes formed thereupon without application of power thereto. Thus, the insert injection molding of the invention allows the cap assembly to be easily molded by use of a typical molten resin while ensuring electrical stability during the process. Additionally, the insert injection molding of the invention eliminates a coating process for preventing an electrical short, and a danger of electrical damage to the protective circuit. Furthermore, as the protective circuit module is not molded together with the battery body within the mold, there are no problems, such as instability of the battery body due to application of pressure or heat to the battery body occurring when the protective circuit is molded together with the battery body within the mold, and defects due to dimensional errors of the battery body inserted into the mold. Instead, the insert injection molding of the cap assembly provides an advantage of reduction in size of the mold due to the fact that it is unnecessary to insert the battery body into the mold.

During insert injection molding, the top cap and the cap subassembly are formed into an integral body via solidification of the molten resin. At this time, in order to enhance coupling force to the resinous injection material, the top cap preferably has one or more fixing recesses formed thereon to allow a portion of the molten resin to infiltrate thereto. Accordingly, the molten resin infiltrating the fixing recesses acts to enhance the coupling force between the top cap and the resinous injection material after being solidified.

One of the most important considerations with regards to the insert injection molding is a problem of movement of the cap subassembly, in particular, the protective circuit module. Thus, it is desirable that the protective circuit module and the top cap are provided as a coupled construction before being inserted into the mold.

As for an example of such coupled constructions, the protective circuit module and/or the top cap may have one or more guide grooves formed thereon to prevent the protective circuit module and the top cap from being misaligned upon the insert injection molding, and the cap assembly may further comprise one or more connecting members coupled to the guide grooves to connect the protective circuit and the top cap. Each of the connecting members may be provided as a separate member or may be provided as a protrusion formed on the top cap or on the protective circuit module so as to be coupled to the guide grooves. One or both of the connecting members may be used for electrical connection between the protective circuit module and the top cap.

In accordance with another aspect of the present invention, there is provided a method for manufacturing a secondary batter using an integral cap assembly according to the invention, the method comprising the steps of: a) inserting an electrode assembly comprising a cathode, a separator and an anode therein into a battery can, b) mounting the cap assembly on an opening of the battery can, followed by coupling the battery can and the cap assembly; and c) injecting an electrolyte into the battery can through an electrolyte injection port formed through the cap assembly, followed by sealing the electrolyte injection port.

In step b), the cap subassembly can be coupled to the battery can through various methods, such as fastening, bonding, forming, and the like. Fastening is achieved in such a manner that fastening structures, such as fasteners, fastening grooves, and the like are formed to the battery can and the cap subassembly, respectively, such that the cap subassembly can be coupled to the battery can through fastening of the fastening structures. Fastening may be performed by use of clamps. Bonding may be performed by providing adhesives between contact surfaces of the top cap and the cap assembly, applying a molten resin on the contact surfaces of the top cap and the cap assembly, or attaching an adhesive tape or a label thereto. Welding may comprise laser welding, soldering, and the like. Most preferably, joining of the cap subassembly to the top cap may be performed through laser welding.

In step b), the cap subassembly may be mounted on the opening of the battery can such that a protective circuit module is located at an upper portion of the top cap. Alternatively, the cap subassembly may be mounted on the opening of the battery can such that the protective circuit module is located at a lower portion of the top cap. In the latter case, the protective circuit module is embedded in a resinous injection material, and thus can be prevented from contacting the electrolyte. This construction can be provided by manufacturing the cap assembly such that an electrode lid for electrical connection between the protective circuit module and the electrode assembly can be exposed from an outer surface of the resinous injection material during manufacturing the cap assembly. It should be noted that various constructions of the battery is not departed from the scope of the invention as long as the battery is manufactured using the integral cap assembly of the invention.

In accordance with yet another aspect of the present invention, there is provided a secondary battery manufactured by the method of the invention. The secondary battery of the invention is not limited to a particular kind of secondary battery. Thus, the secondary battery of the invention may be a lithium secondary battery in view of the construction of the electrode assembly, and may be a rectangular secondary battery in view of the shape of the battery can.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Preferred embodiments of the invention will now be described with reference to the drawings. It should be noted that the embodiments are disclosed for the purpose of illustration, and do not limit the scope of the invention.

Figure 1:
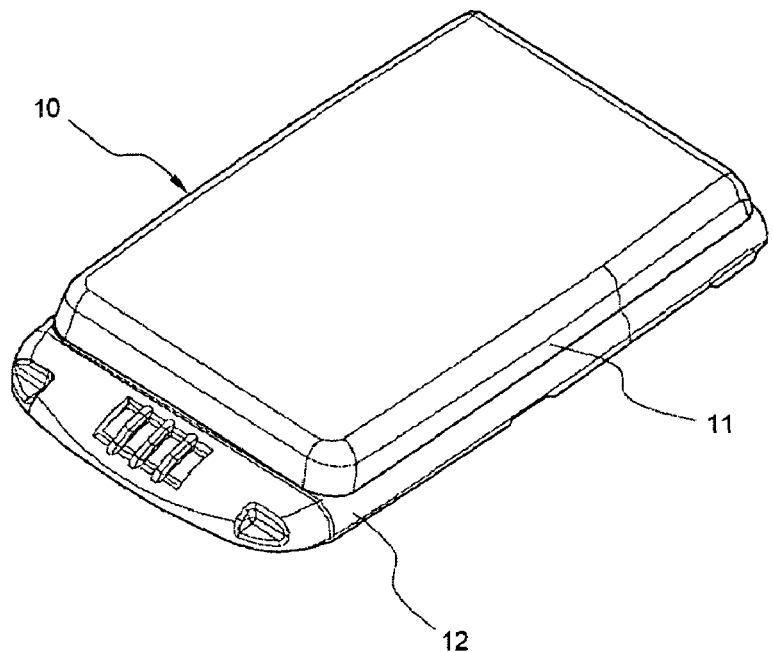
FIG. 1 is a diagram of an external secondary battery.
Figure 2:
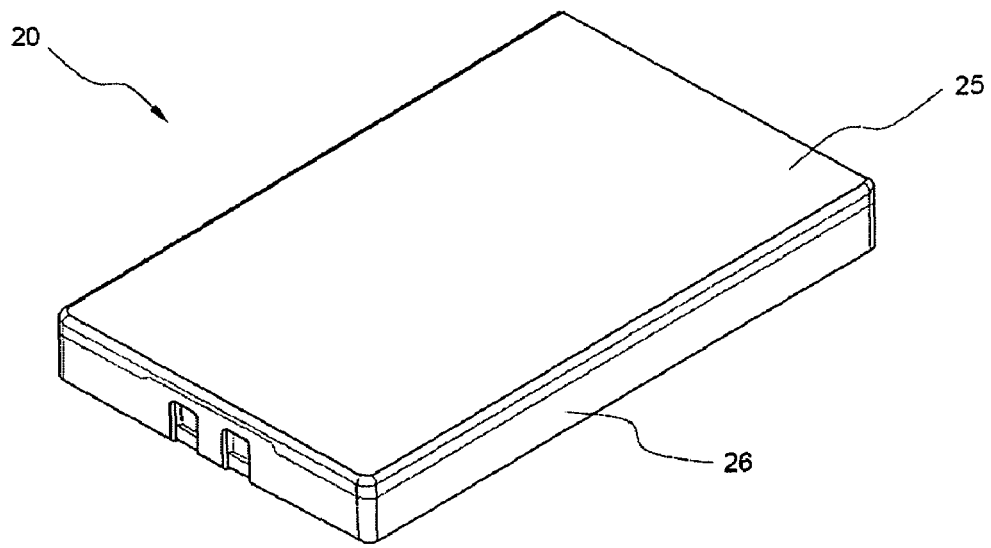
FIG. 2 is a diagram of an internal secondary battery of the prior art.
Figure 3:
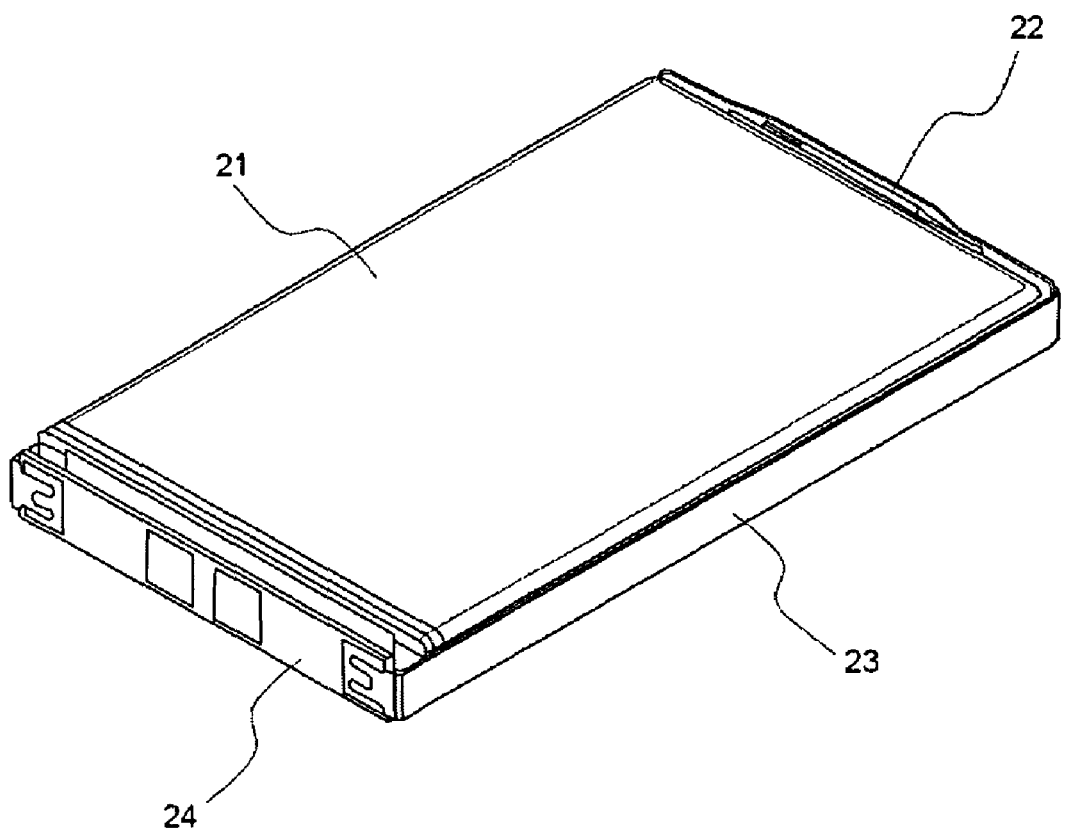
FIG. 3 is a partially assembled view of the secondary battery of FIG. 2.
Figure 4:
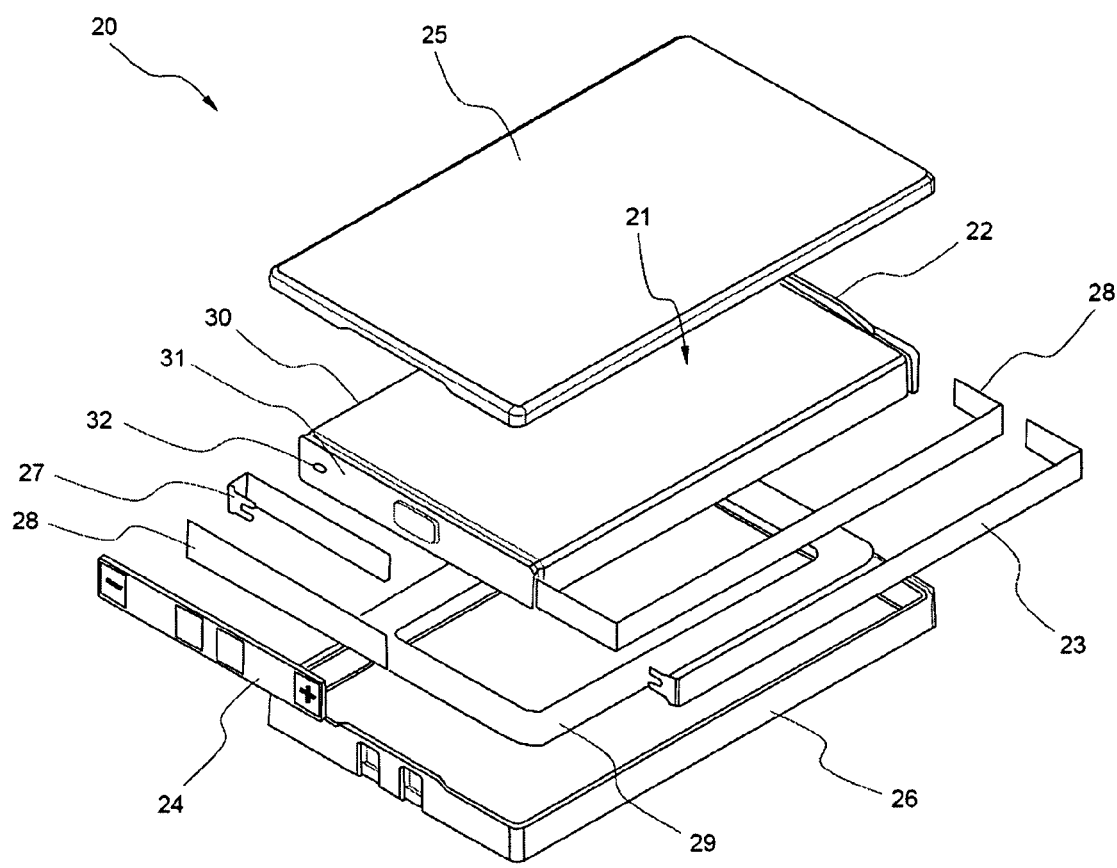
FIG. 4 is an exploded perspective view of the secondary battery of FIG. 2.
Figure 5:
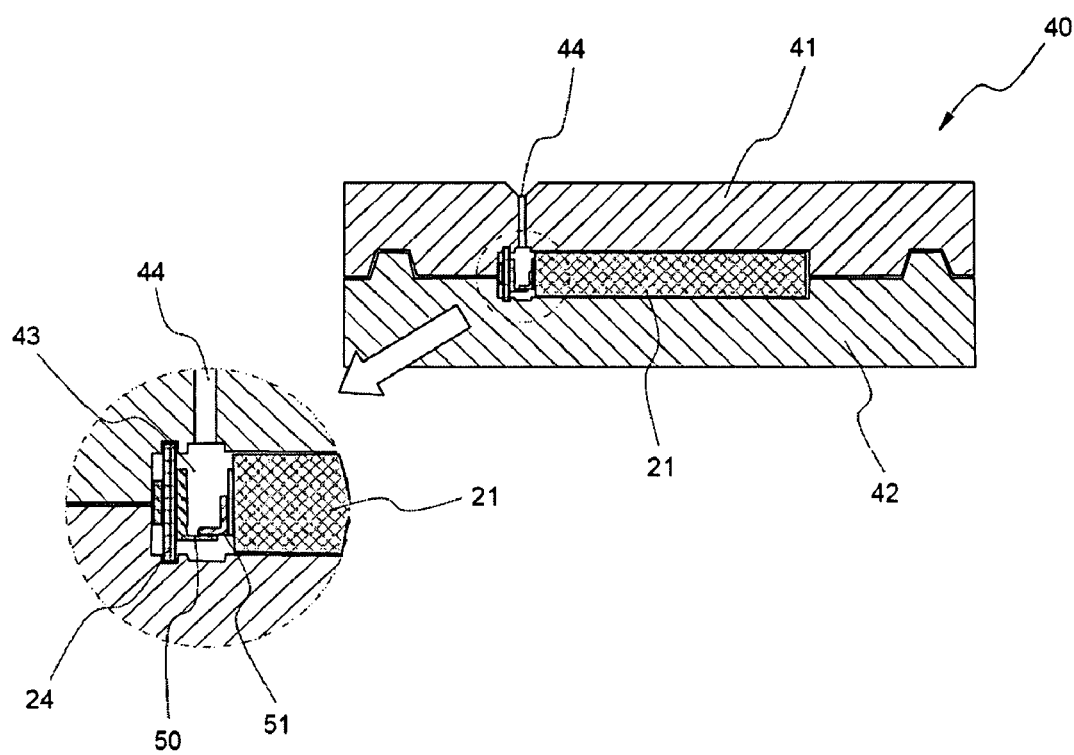
FIG. 5 is a cross-sectional view illustrating a process of insert injection molding of the prior art.
Figure 6:
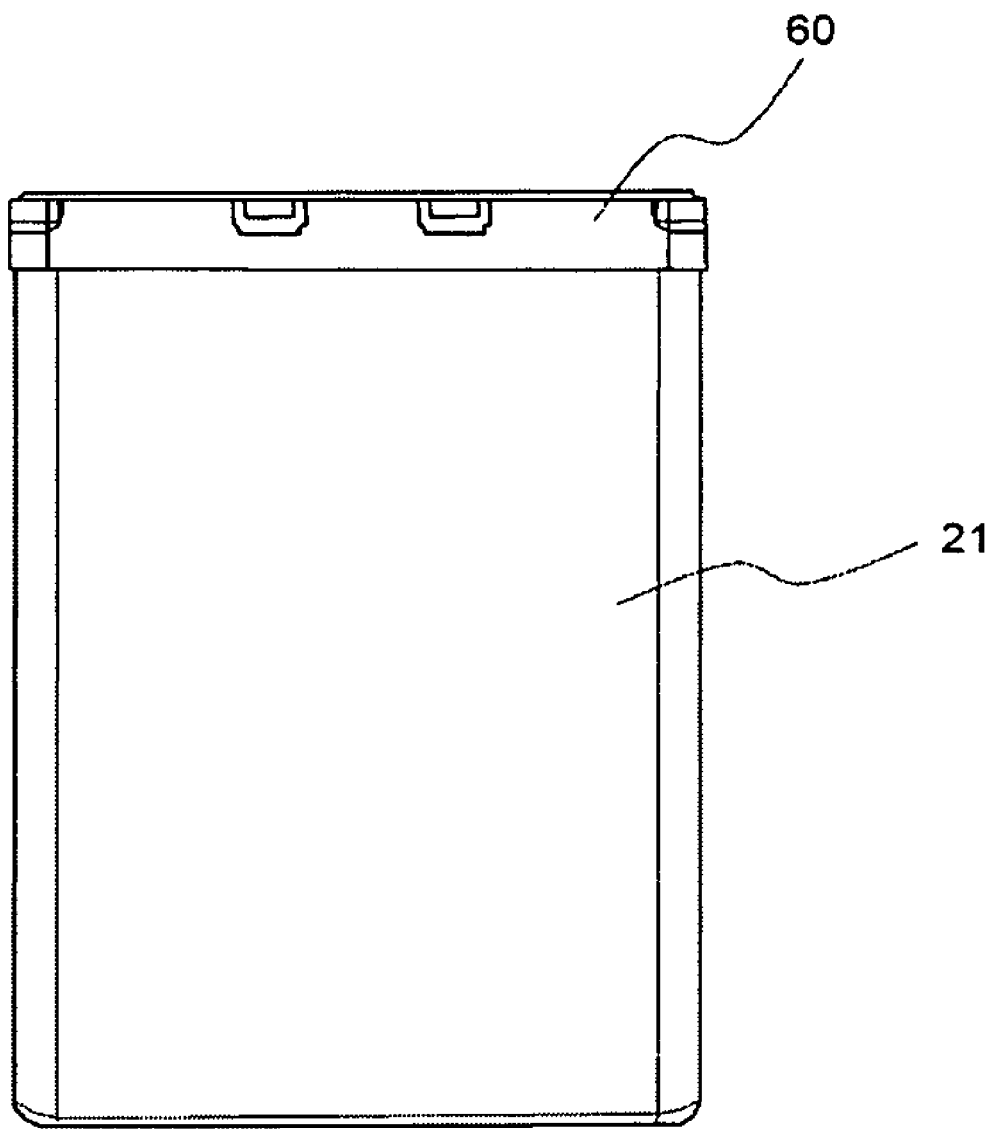
FIGS. 6 and 7 are a front view and a side view illustrating a secondary battery manufactured by the insert injection molding process of FIG. 5.
Figure 7:
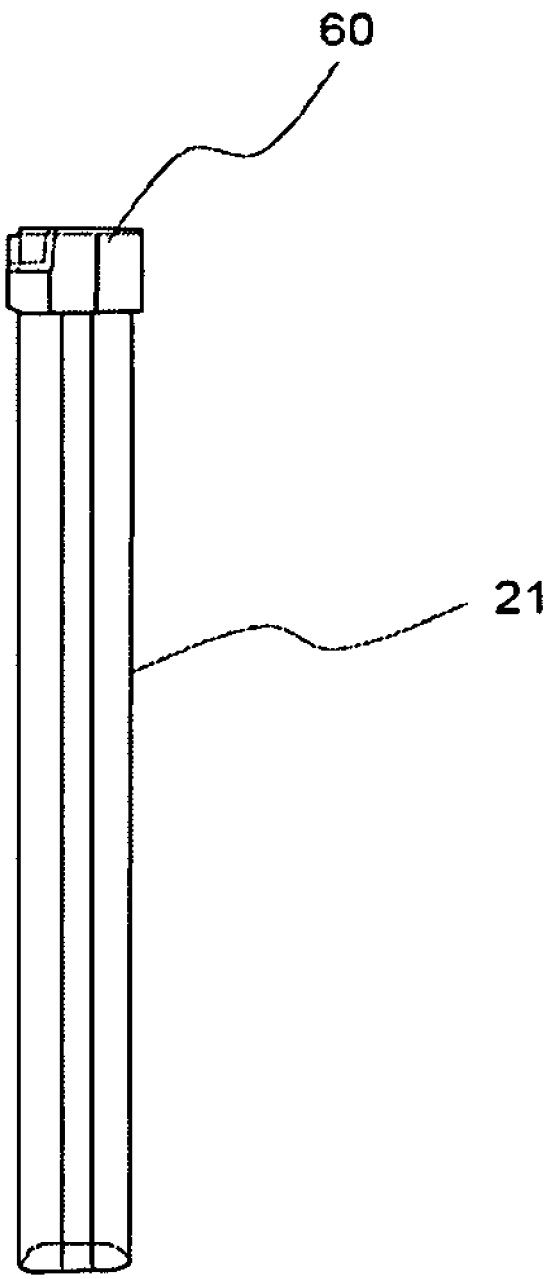
Figure 8:
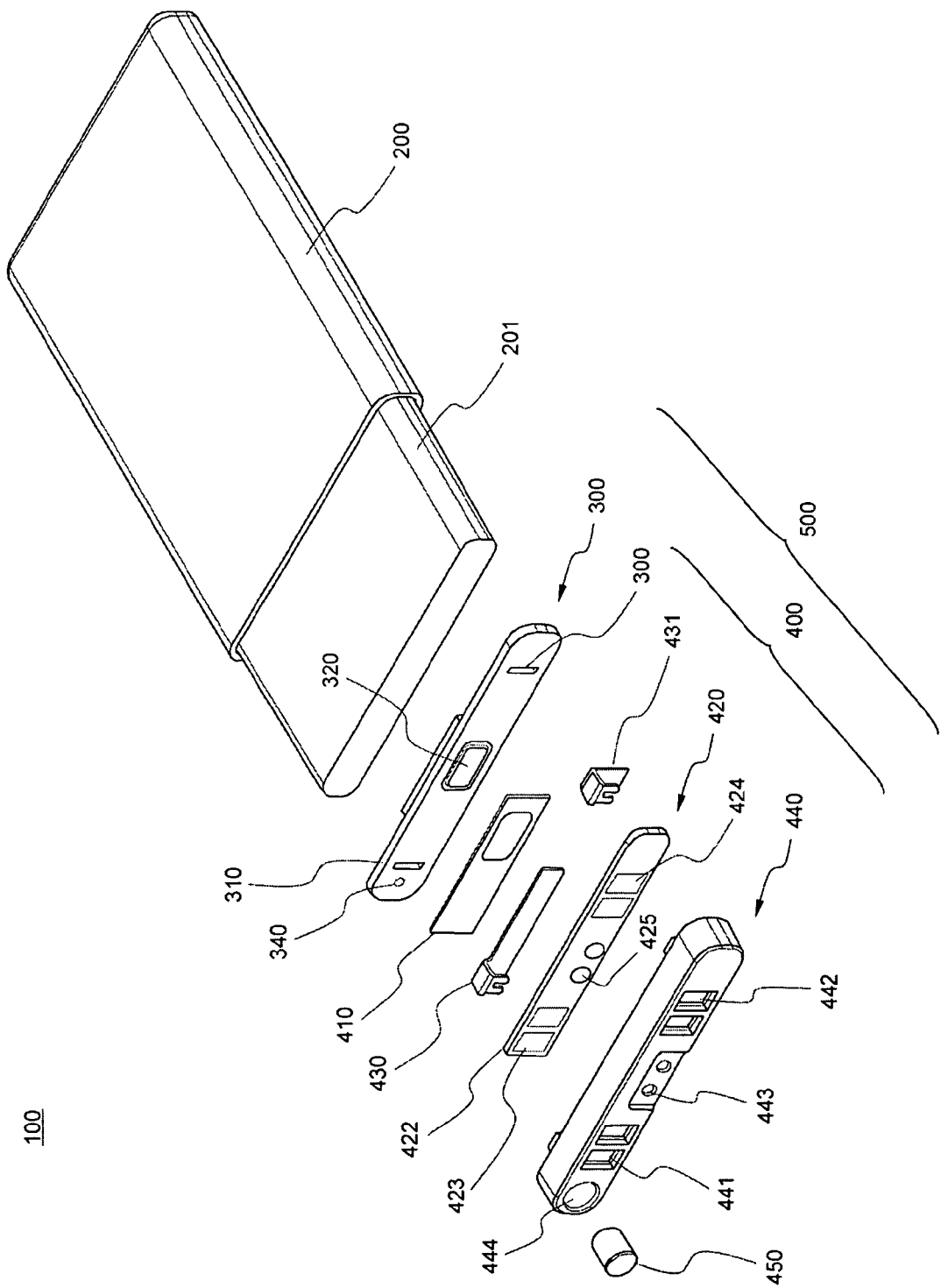
FIG. 8 is an exploded perspective view of a secondary battery in accordance with one preferred embodiment of the invention.
Figure 9:
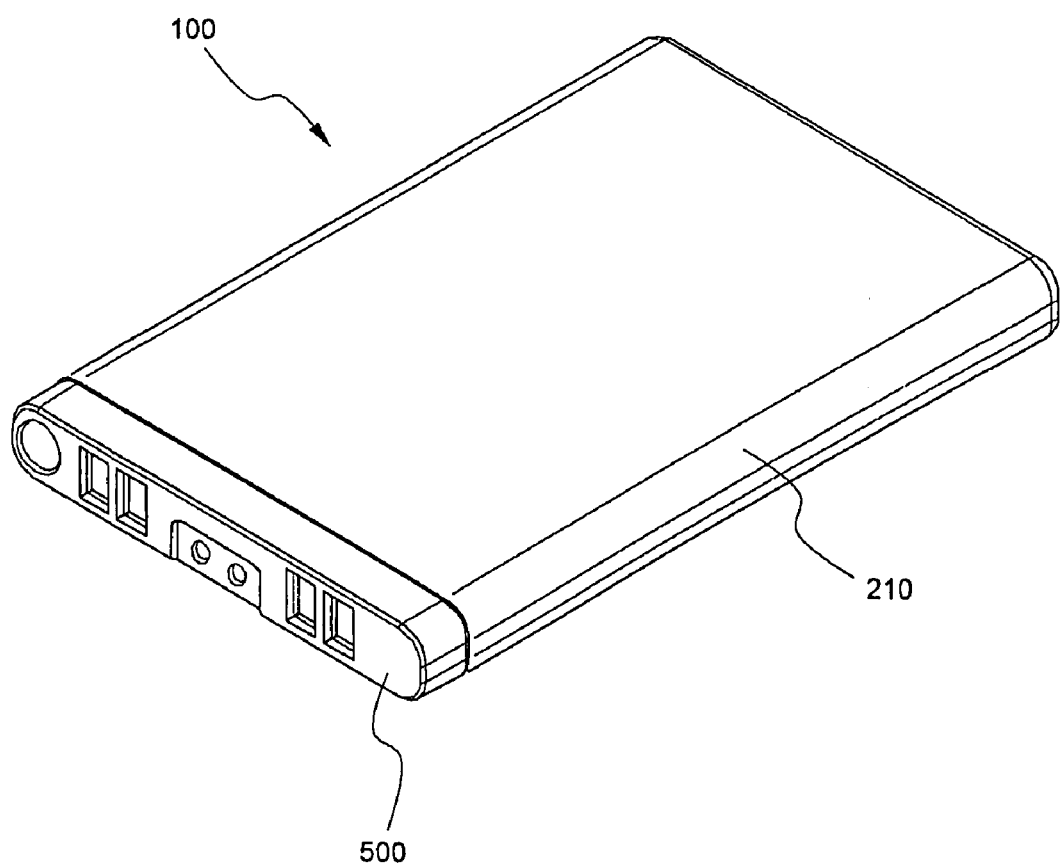
FIG. 9 is a perspective view of the secondary battery of FIG. 8 in an assembled state.

FIG. 8 is an exploded perspective view of a secondary battery in accordance with one preferred embodiment of the invention, and FIG. 9 is a perspective view of the secondary battery of FIG. 8 in an assembled state.

Referring to FIGS. 8 and 9, a secondary battery 100 comprises a battery can 200 into which an electrode assembly 210 consisting of a cathode, an anode and a separator is inserted, a top cap 300 mounted on an opening of an upper end of the can 200, and a cap subassembly 400 mounted on the top cap 300.

The top cap 300 comprises a plate 310 made of an electrically conductive material, such as aluminum, a protruded terminal 320 formed on the conductive plate 310 so as to be insulated from the conductive plate 310 and connected to the cathode or to the anode of the electrode assembly 210, a fixing recess 330 for increasing coupling force to a resinous injection material during insert injection molding, and an electrolyte injection port 340. The conductive plate 310 constitutes electrode terminals when coupled to the battery can 200 connected to the anode and cathode of the electrode assembly 210. Optionally, a clad plate consisting of Al—Ni boned on the conductive plate 310 may be formed into the electrode terminals. With regard to this, Al—Ni clad can enhance contacting force to the conductive plate 310 when it contacts the conductive plate 310 made of aluminum.

The cap subassembly 400 comprises an insulating member 410 for insulating cap subassembly 400 from the top cap 300 except the protruded terminal 320, a protective circuit module 420 for controlling over-charge, electrode lids 430 and 431 for electrically connecting the top cap 300 and the protective circuit module 420, and a cap housing 440 for stably enclosing the protective circuit module 420 and the like.

The protective circuit module 420 is an element comprising a protective circuit 421 formed on a substrate 422 to protect the battery from over-current, over-discharge, and over-charge upon charging or discharging. The substrate 422 having the protective circuit 421 formed thereon is generally made of an epoxy compound resin.

The substrate 422 may be formed with outer input and output terminals 423 and 424 on a rear side of the substrate 422 opposite to a side on which the protective circuit 421 is formed, a connection cord connected to a connector, and the like. The protective circuit 421 and the respective outer input and output terminals 423 and 424 are connected to each other through holes perforated through a thickness of the substrate. Additionally, a test point 425 is formed on the substrate 422.

The protective circuit module 420 and the terminals on the cap 300 are electrically connected to each other through the connection terminals on the protective circuit module 420 or through the electrode lids 430 and 431. Alternatively, a wire may be used for connection between the protective circuit module 420 and the terminals on the cap 300. The electrode lid 430 may be made of, for example, nickel or Al—Ni clad, and is electrically connected to the electrode terminals 310 and 320 through spot welding, laser welding, and the like.

The cap housing 440 is formed with windows 441 and 442 through which the outer input and output terminals 423 and 424 of the protective circuit module 430 are exposed to the outside, and with a hole 443 through which the test point 425 is exposed to the outside. Additionally, the cap housing 440 is formed with a perforation 444 communicated with the electrolyte injection port 340 to inject an electrolyte into the battery after completing assembly of the battery, and sealed with a sealing cap 450 after injection of the electrolyte.

According to the present invention, the top cap 300 and the cap subassembly are integrated to a separate cap assembly 500.

Figure 10:
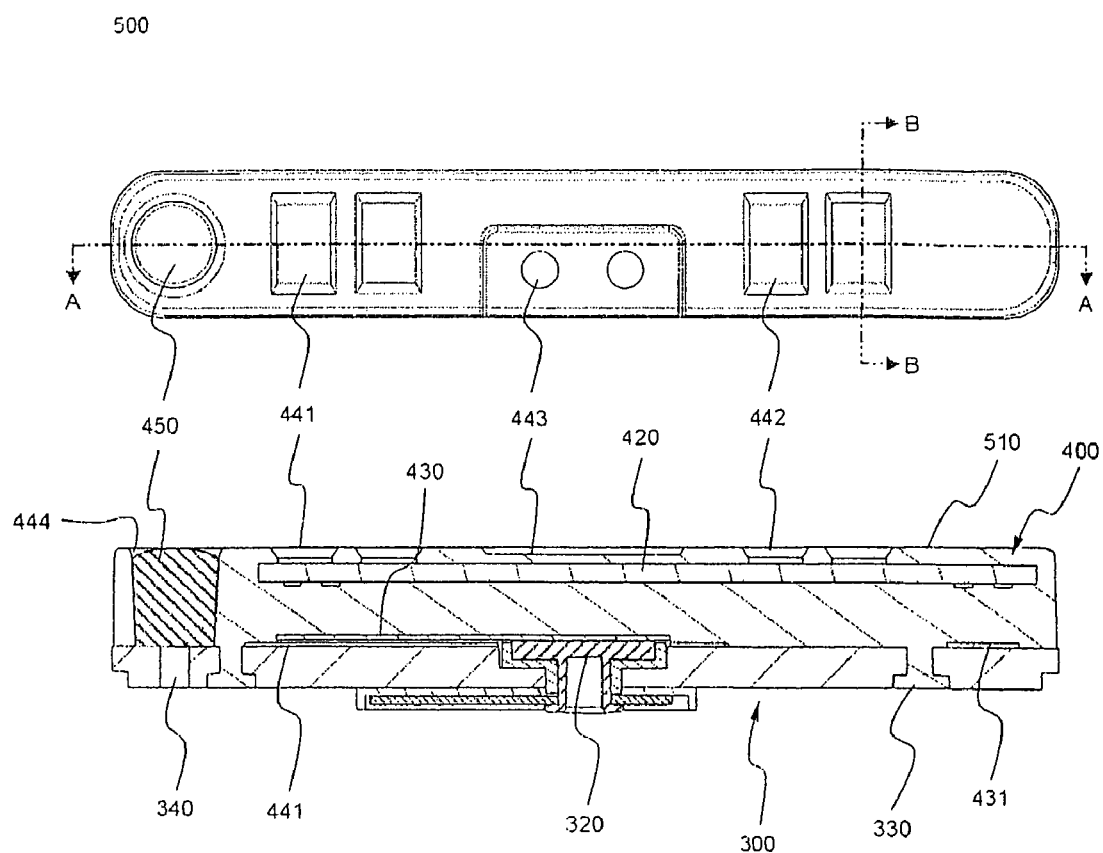
FIG. 10 is a plan view of an integral cap assembly manufactured by insert injection molding according to one preferred embodiment of the invention, and a cross-sectional view taken along line A-A of the plan view.

FIG. 10 is a plan view of an integral cap assembly manufactured by insert injection molding according to one preferred embodiment of the invention, and a cross-sectional view taken along line A-A of the plan view.

Referring to FIG. 10, the cap assembly 500 is manufactured through insert injection molding, in which the protective circuit module 400 is integrally coupled to the top cap 300 acting as a base plate by means of a resinous injection material 510 that is made by solidifying a molten resin.

The top cap 300 is formed at either side with a fixing groove 330 into which the molten resin is infiltrated and solidified during the insert injection molding, and at one side of the fixing groove 330 with the perforation 444. The fixing groove 330 may have a downward taper or a large diameter defined at a lower portion of the fixing grove 330, as shown in FIG. 10, thereby preventing the top cap 300 from being separated from the resinous injection material 510 even if a large impact is applied to the upper end of the battery. The protruded terminal 320 is formed at the center of the top cap 300, and is insulated from the top cap 300.

The protruded terminal 320 is electrically connected to the protective circuit module 420 through the electrode lid 430, which is electrically insulated form the top cap 300 by the insulating member 410. Additionally, since the conductive top cap 300 constitutes the electrode terminals, it is electrically connected to the protective circuit module 420 through the electrode lid 431.

The resinous injection material surrounding the protective circuit module 420 is formed at an upper end thereof with the windows 441 and 442 for the terminals, and with the hole 443 for the test point, such that the outer input and output terminals, and the test point of the protective circuit module 420 are exposed to the outside therethrough, respectively.

After completing injection of the electrolyte, the perforation 444 of the resinous injection material 510 is sealed by the sealing cap 450. The sealing cap 450 may be formed of a plastic molding material or a rubber.

According to the present invention, since the insert injection molding is performed in a state wherein the protective circuit module and the top cap acting as the base plate are inserted into a mold without providing a battery body into the mold, defective products are almost completely eliminated even if the insert injection molding is performed using a molten resin having a high temperature and high pressure as well as a molten resin having a low temperature and low pressure. Thus, the resin applied to the insert injection material of the protective circuit module includes a polyethylene resin, a polypropylene resin, an epoxy resin, and the like, having a high temperature and high pressure, as well as a polyamide having a low temperature and low pressure. Additionally, the resin may include a general resin.

As such, since the method for manufacturing an insert injection molded form having the protective circuit module employs components through which electric current does not flow during the insert injection molding, the method does not require a separate process or a separate member for electrical insulation of the mold unlike the prior art. Additionally, a completed component through the insert injection molding has a reduced size, thereby reducing unnecessary space arising when the battery body is insert injection molded together with other components within the mold as in the prior art.

One of the most important considerations during insert injection molding using the cap subassembly having the protective circuit module as an insert is a problem of movement of the cap subassembly, in particular, the protective circuit module 420. With regard to this, FIG. 11 is a cross-sectional view along line B-B of FIG. 10.

Figure 11:
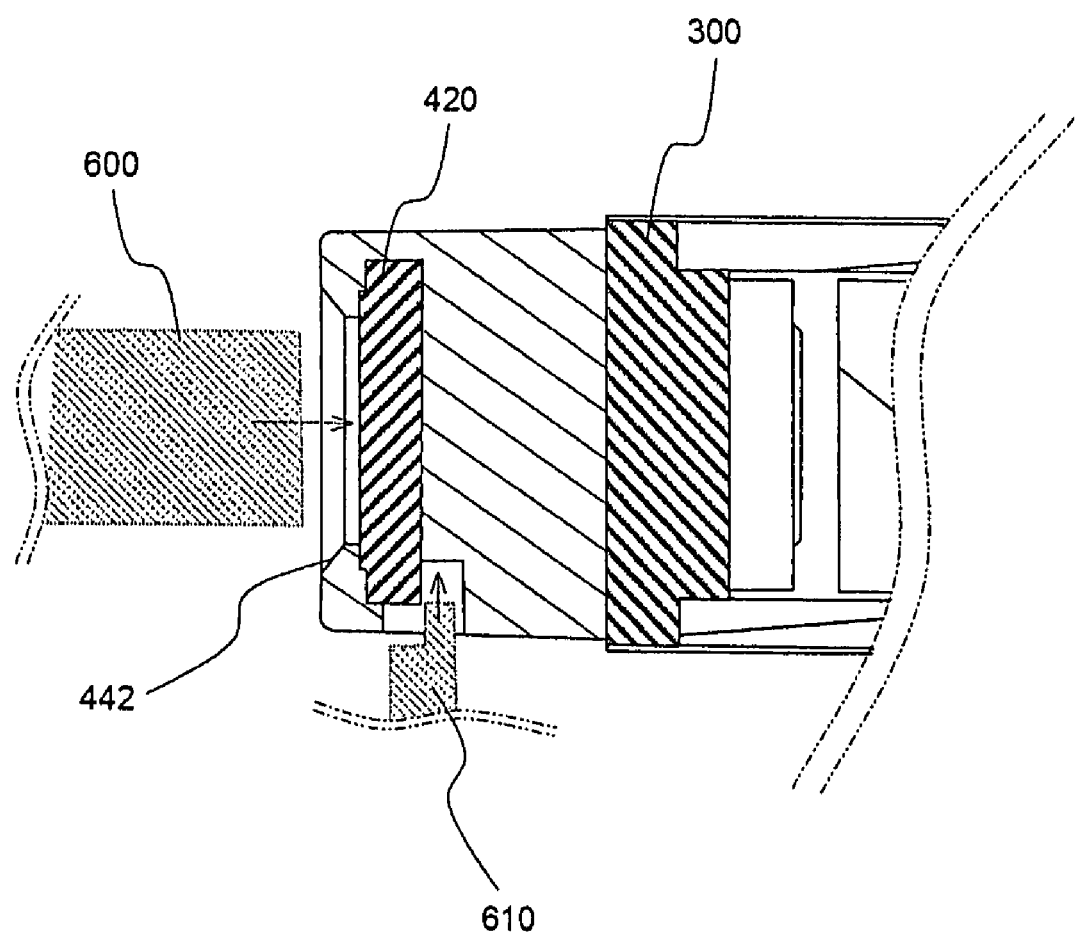
FIG. 11 is a cross-sectional view along line B-B of FIG. 10.

Referring to FIG. 11, in order to prevent the protective circuit module 420 from moving during insert injection molding, with the top cap 30 and the protective circuit module 420 inserted into the mold, the protective circuit module 420 is fixed by a first guide member 600 introduced in a direction of the window for the terminals, and a second guide member 610 introduced in a direction of the resin injection port. The first guide member 600 also serves to form the window 442 for the terminals so as to allow the outer input and output terminals of the protective circuit module 420 to be exposed to the outside. The second guide member 610 has a front end with a shape appropriately matched to the side section of the protective circuit module 420. Thus, the protective circuit module 420 can be stably fixed in position on the top cap 300 within the mold by cooperation of the first and second guide members 600 and 610 during insert injection molding.

Figure 12:
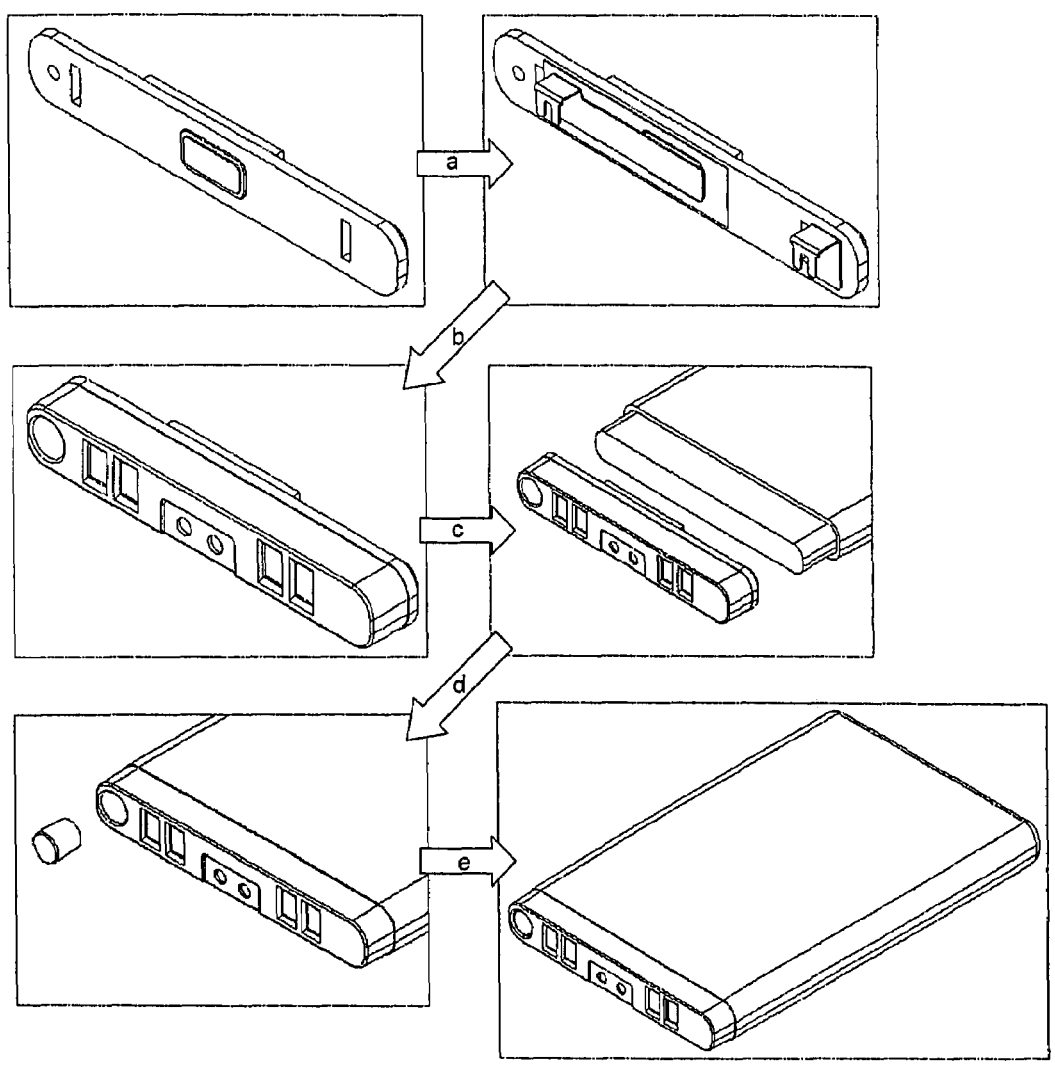
FIG. 12 is a flow diagram illustrating a method for manufacturing a battery using the integral cap assembly of FIG. 10.

FIG. 12 is a flow diagram illustrating a method for manufacturing a battery using the integral cap assembly of FIG. 10. The method will be described in detail as follows.

In step a), a base plate assembly is formed by assembling electrode terminals onto a top cap acting as a base plate, and then a cap subassembly having a protective circuit module is formed by mounting a cathode lid, an anode lid, the protective circuit module, and the like on one side of the top cap. If necessary, an insulating member is further provided to the cap subassembly in order to prevent short between the components. At this time, the components including the electrode lids, the insulating member, and the like are assembled by spot welding.

In step b), the cap subassembly having the protective circuit module is inserted into a molding space within a mold, and a molten rein is injected into the molding space, such that the other side of the top cap is exposed to the outside, followed by insert injection molding, thereby forming an integral cap assembly in accordance with the invention. As the molten resin is solidified, the components, such as the top cap, the protective circuit module, the electrode lids, the insulating member, and the like are fixed by means of the solidified resin, thereby forming the integral member, that is, the integral cap assembly.

In step c), the cap assembly is coupled to an opening of a battery can, which has an electrode assembly equipped therein, through the other side of the top cap exposed to the outside of the resinous injection material. Coupling between the cap assembly and the battery may be performed by fastening, bonding, welding, etc., and preferably performed by laser welding.

In step d), an electrolyte is injected through an electrolyte injection port exposed through a perforation, and then the injection port is sealed by a sealing cap.

In step e), when completing the assembly of the battery, the battery can is subjected to a direct post-process. At this time, various coating methods may be freely applied to the battery can, and finally, the battery can is enclosed by use of a label.

Figure 13:
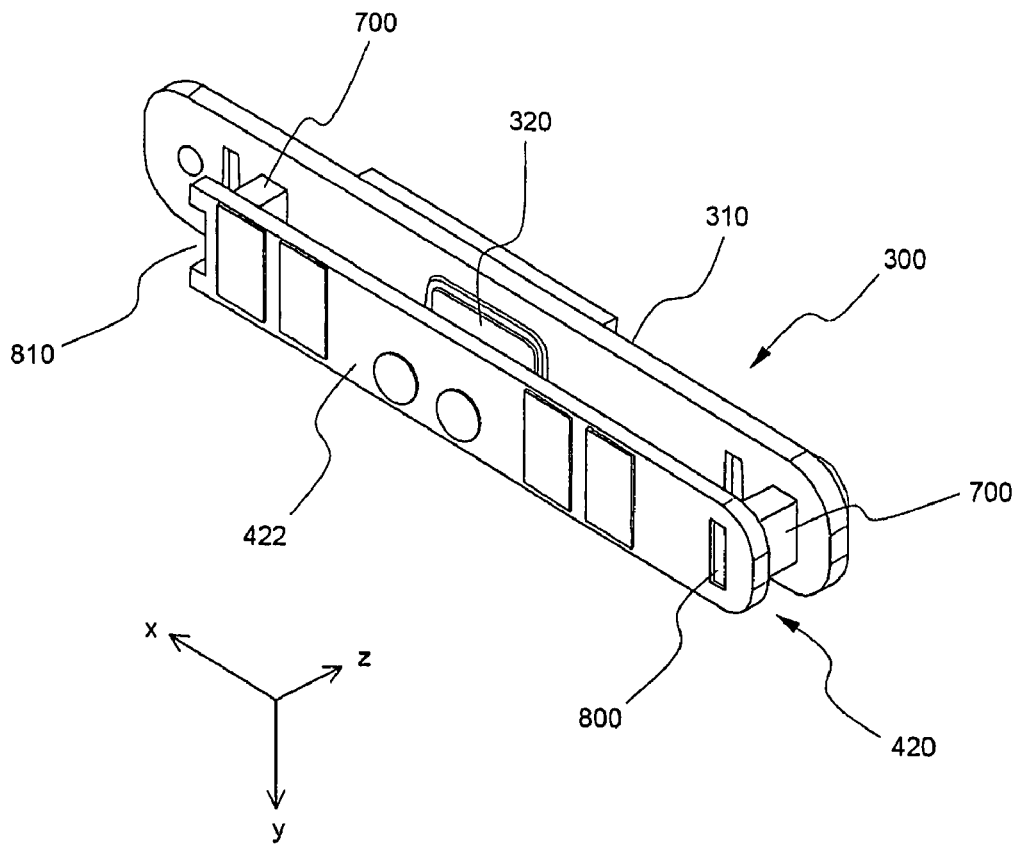
FIG. 13 is a perspective view illustrating a cap subassembly having a protective circuit module in an integral cap assembly in accordance with another embodiment before insert injection molding.
Figure 14:
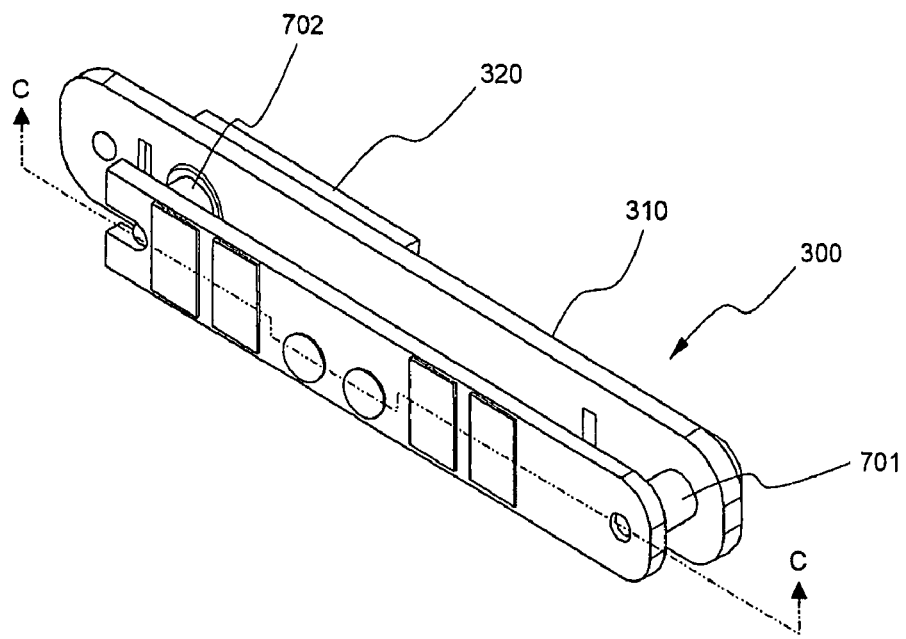
FIG. 14 is a perspective view illustrating a cap subassembly having a protective circuit module in an integral cap assembly in accordance with yet another embodiment before insert injection molding.
Figure 15:
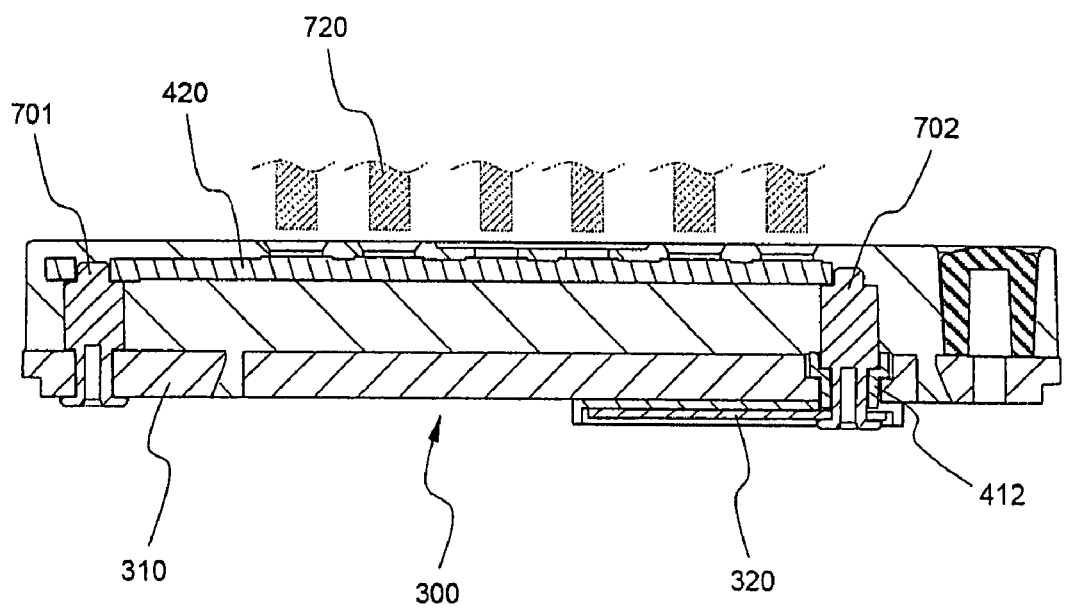
FIG. 15 is a cross-sectional view taken along line C-C of the integral cap assembly manufactured by insert injection molding using the cap subassembly including the protective circuit module of FIG. 14.

FIGS. 13 and 14 are perspective views illustrating a cap subassembly having a protective circuit module in integral cap assemblies in accordance with other embodiments before insert injection molding, respectively. FIG. 15 is a cross-sectional view taken along line C-C of the integral cap assembly manufactured by insert injection molding using the cap subassembly having the protective circuit module of FIG. 14. With the cap subassembly having the protective circuit module, the protective circuit module 420 can be prevented from moving during insert injection molding, and in some cases, electrical connection between the protective circuit module and the top cap can be achieved during insert injection molding.

First, referring to FIG. 13, in order to prevent the protective circuit module from moving within the mold during insert injection molding, the conductive plate 310 of the top cap 300 is formed with two protruded connecting members 700, and the substrate 422 of the protective circuit module 420 is formed with the guide grooves 800 and 810 to which the connecting members 700 can be fastened, such that the protective circuit module 420 is fixed to the conductive plate 310 through fastening of the connecting members 700 and the guide grooves 800 and 810.

The connecting members 700 are integrated to the conductive plate 310, and may be formed when processing the conductive plate 310. Fastening between the connecting members 700 and the guide grooves 800 and 810 prevents the protective circuit module 420 from moving in the x-direction and the y-direction, and the guide member 600 (see FIG. 11) on the mold prevents the protective circuit module 420 from moving in the z-direction, thereby preventing the movement of the protective circuit module 420 during insert injection molding. With the construction of the connecting members 700 and the guide grooves 800 and 810, it is not necessary to provide an additional guide member (610 in FIG. 11) to the mold.

The shapes of the connecting members 700 and the guide grooves 800 and 810 are not restricted to a particular shape. For example, the shape of the guide grooves 800 is not restricted to a perforation, and one of the guide grooves 810 may be formed as an indentation, as shown in FIG. 13. That is, the indentation of the guide groove 810 is opened at one side, thereby preventing a difficulty in coupling due to an assembly tolerance.

One of the two connecting members 700 may be constructed to act as a lid or a wire for electrical connection between the conductive plate 310 of the top cap acting as one electrode terminal and the protective circuit module 420, thereby eliminating the necessity of an additional lid or wire for the electrical connection therebetween. On the other hand, for electrical connection between the protruded electrode terminal 320 formed on the conductive plate 320 and the protective circuit module 420, it may be necessary to provide a lid or wire, and optionally, the electrode terminal 320 may be provided as a higher protrusion so as to be directly connected to the protective circuit module 420.

Preferably, in order to reinforce a function of the connecting members 700 supporting the protective circuit module 420, additional processes including soldering may be performed to a contact portion between the connecting members 700 and the protective circuit module 420.

Referring to FIGS. 14 and 15, connecting members 701 and 702 are provided as separate members, and fastened to the top cap 300. The connecting members 701 and 702 are different from the connecting members 700 of FIG. 13 in that both connecting members 701 and 702 serve as a lid or wire for electrical connection. In order to ensure the electrical connection between the connecting member 702 and the protective circuit module 420, the anode terminal 320 is located near to the connecting member 702. The connecting member 701 for the cathode terminal is directly connected to the conductive plate 310 of the top cap 300, whereas the anode terminal 320 and the connecting member 702 for the anode terminal 320 are insulated from the conductive plate 310 by means of the insulating material 412.

The connecting members 701 and 702 are coupled onto the conductive plate 310 by use of rivets, and connected to the protective circuit module 420 by bonding or welding, thereby serving as the lid or wire.

The protective circuit module 420 can be stably fixed in position on the top cap 300 within the mold through coupling between the connecting members 701 and 702 and the guide grooves 600 and 601, and through cooperation of the guide member 720 acting as the first guide member 600 as shown in FIG. 11 during insert injection molding.

Figure 16:
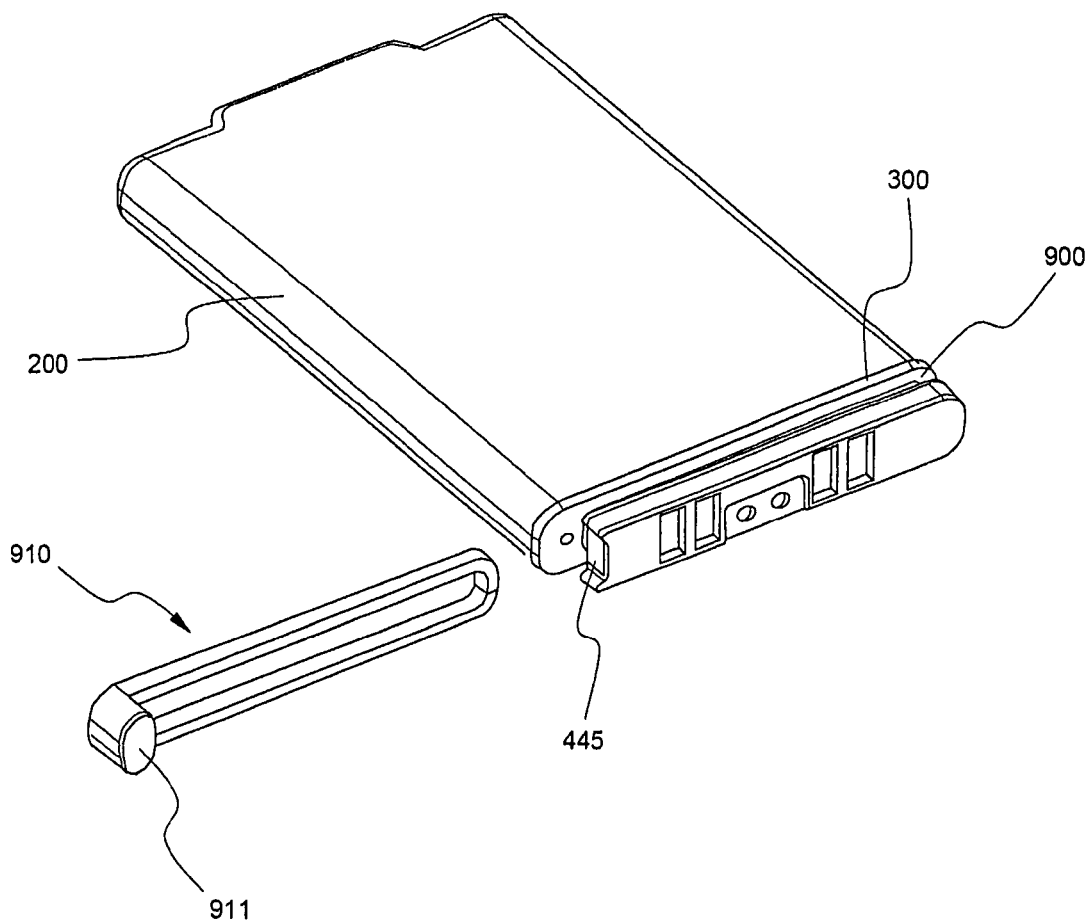
FIG. 16 is a perspective view illustrating an integral cap assembly having a groove formed along an outer peripheral surface of an upper end of a top cap in accordance with yet another embodiment of the invention.
Figure 17:
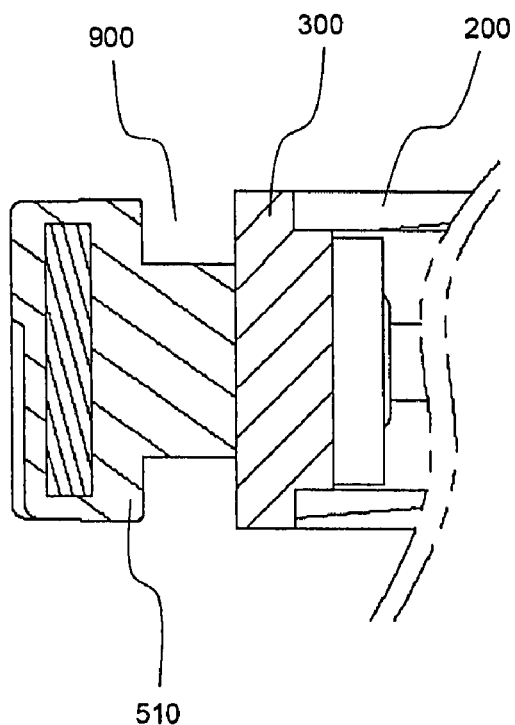
FIG. 17 is a vertically cross-sectional view of FIG. 16.
Figure 18:
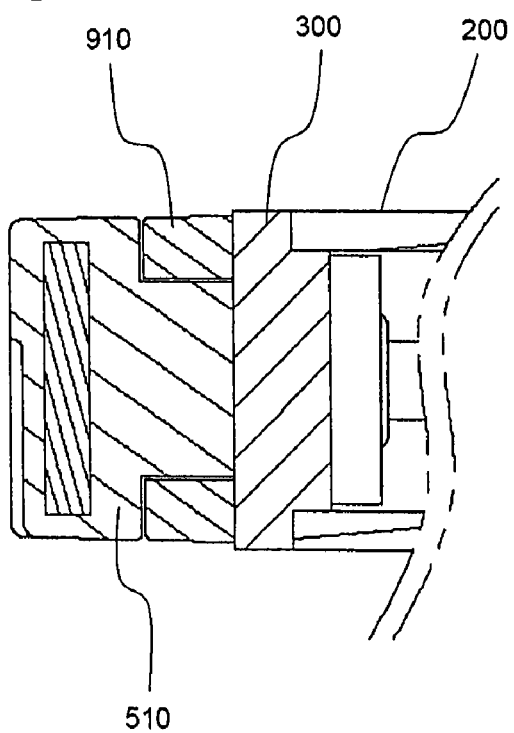
FIG. 18 is a cross-sectional view illustrating the cap assembly coupled to the battery can in which a ring member is fastened to the groove of FIG. 16.
Figure 19:
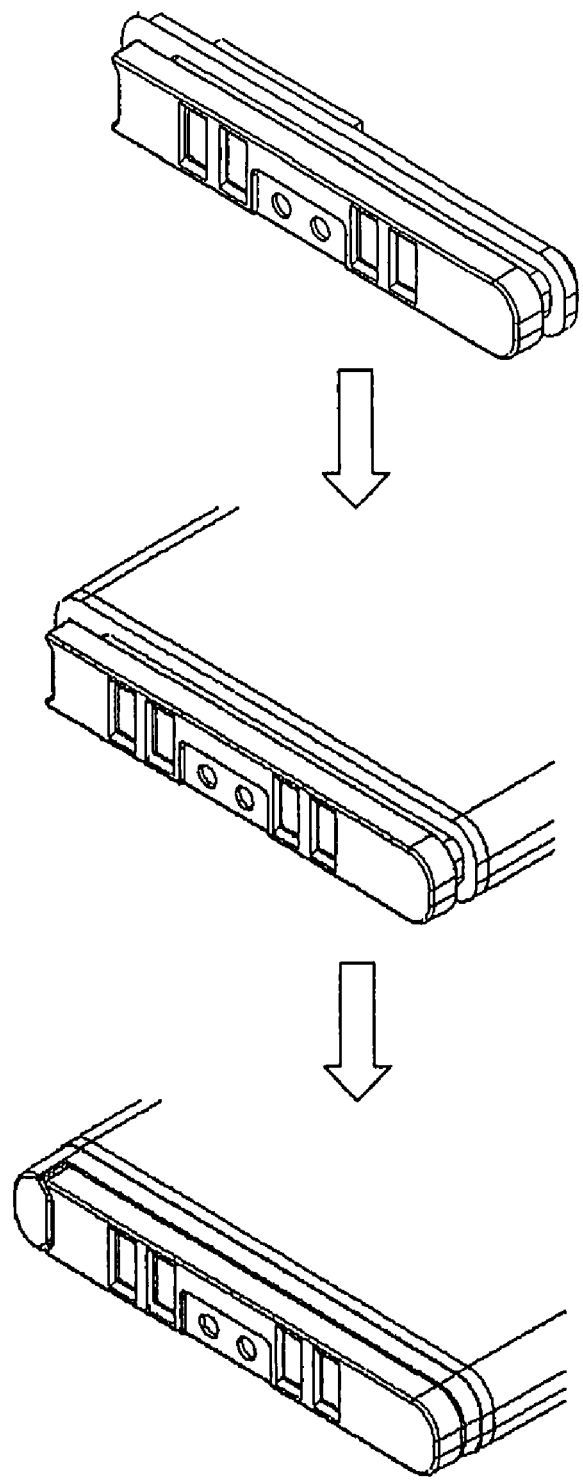
FIG. 19 is a flow diagram illustrating processes for coupling the cap assembly of FIG. 16 to the battery can, and fastening the ring member to the groove.

FIGS. 16 and 17 are a perspective view illustrating an integral cap assembly having a groove formed along an outer peripheral surface of an upper end of a top cap in accordance with yet another embodiment of the invention, and a vertically cross-sectional view of FIG. 16, respectively. FIG. 18 is a cross-sectional view illustrating the cap assembly coupled to a battery can in which a ring member is fastened to the groove. Further, FIG. 19 is a flow diagram illustrating processes for coupling the cap assembly to the battery can, and fastening the ring member to the groove.

Referring to FIGS. 16 to 19, in the integral cap assembly of the invention, the resinous injection material 510 of the upper end of the top cap 300 has a side groove 900 depressed along the outer peripheral surface thereof. As described above, coupling between the battery can 200 and the top cap 300 is preferably performed by laser welding, and at this time, a portion of the resinous injection material 510 adjacent to the top cap 300 can be partially melted or deformed due to heat transferred thereto during welding. In order to prevent this, a welding width must be minimized, which requires a more precise process. Thus, as with the construction described above, the side groove 900 is formed to the resinous injection material 510 along the outer peripheral surface of the upper end of the top cap 300, thereby minimizing problems due to the heat transfer, and increases the width around a processed portion for coupling, thereby allowing easy manufacturing.

Additionally, one side of the integral cap assembly 500 where the electrolyte injection port is located may be formed with an indentation, instead of the perforation 444 as shown in FIG. 10, and a ring member 910 comprises a protrusion 911, which can be fastened to an indentation 445. Accordingly, after injection of the electrolyte, instead of the separate sealing cap 450 as shown in FIG. 11, the ring member 910 is fastened to the side groove 900 and the indentation 445, thereby sealing the electrolyte injection port.

Figure 20:
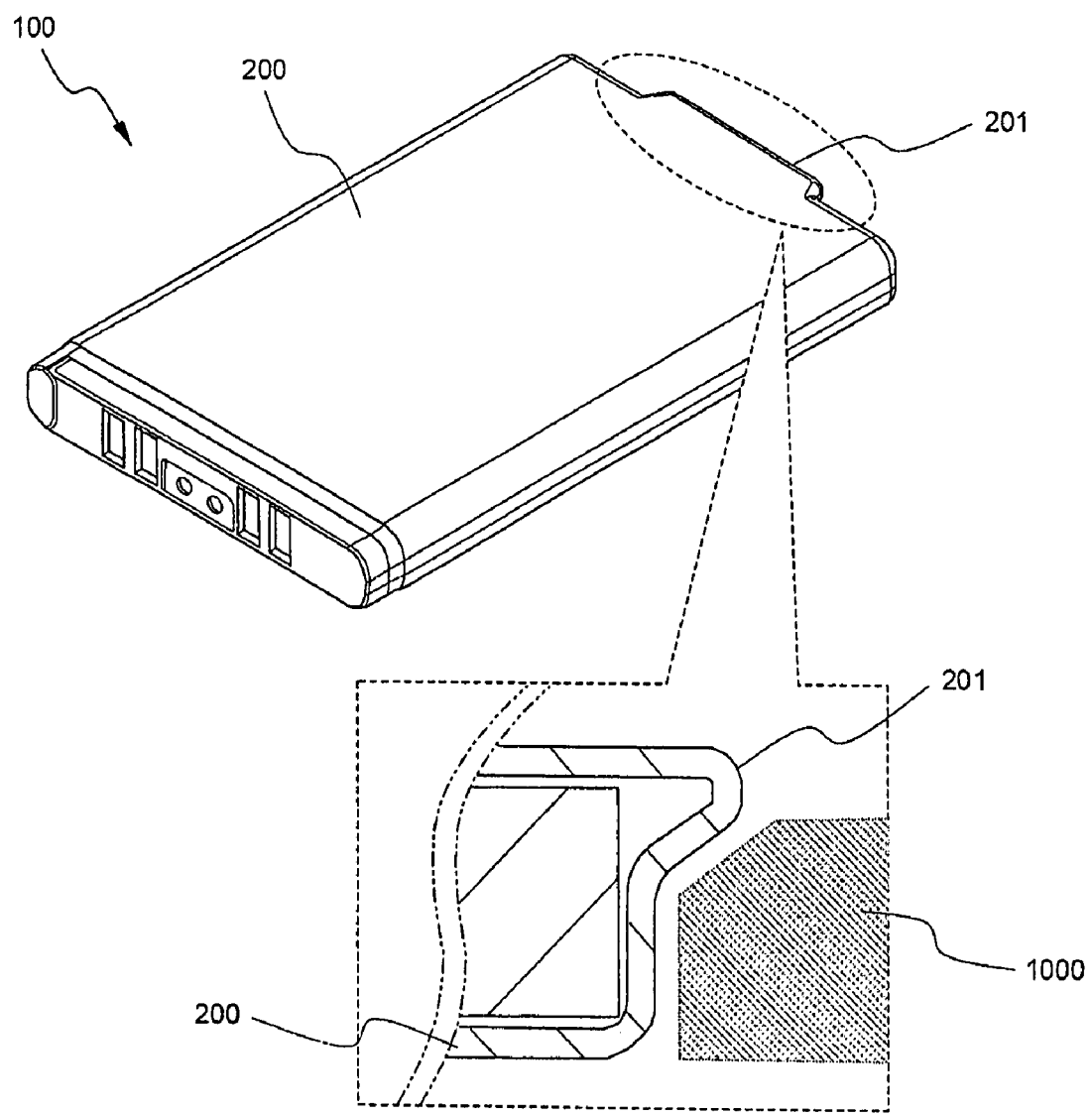
FIG. 20 is a perspective view and a partially enlarged perspective view of a secondary battery according to one embodiment of the invention.

FIG. 20 shows the shape of a secondary battery according to one embodiment of the invention.

Referring to FIG. 20, a secondary battery 100 has a downward protrusion 201 formed at the lower end thereof. As described above, the secondary batteries are classified into the hard cap batteries and the internal batteries, and the present invention is preferably applied to the internal batteries. Thus, the downward protrusion 201 allows the battery to be easily attached to or detached from a device 1000 including a mobile phone, a PDA, and the like. The downward protrusion 201 may be formed not only on the lower end of the battery can 200 but also on a side surface. Furthermore, the shape and the position of the downward protrusion 201 are not restricted to any particular shape and position so long as they can be conducive to easy detachment of the battery.

INDUSTRIAL APPLICABILITY

As is apparent from the above description, the integral cap assembly of the invention, and the method for manufacturing the secondary battery using the same provide an integral member comprising the top cap acting as the base plate, and the cap subassembly having the protective circuit module provided thereon, thereby simplifying the manufacturing process of the battery while minimizing the frequency of product defects. Additionally, the integral cap assembly manufactured through the insert injection molding of the invention provides extinguishable advantages over the conventional technology wherein the battery body is provided together with the other components within the mold. As such, the method for providing a single independent member by integrating the cap subassembly to the top cap is novel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a single integrated cap assembly used for a secondary battery comprising a battery can and the cap assembly, comprising:
   (i) mounting a cap subassembly comprising a protective circuit module on one side of a top cap comprising two electrode terminals such that the protective circuit module is electrically connected to the two electrode terminals of the top cap; and
   (ii) injecting a resin material in the cap subassembly to couple the top cap and the cap subassembly to form the single integrated cap assembly,
   wherein at least one of the protective circuit module and the top can have at least one guide groove formed thereon and configured to prevent the protective circuit module and the top cap from being misaligned within a mold during an injection molding process, and at least one connecting member is coupled to the at least one guide groove to connect the protective circuit module and the top cap; and
   wherein the at least one guide groove comprises first and second guide grooves, said first guide groove having a perforation shape and said second guide groove having an indentation shape.

2. The method as set forth in claim 1, wherein the protective circuit module includes a protective circuit mounted thereon and configured to present an over-current, over-discharge, and over-charge of the battery, and the cap subassembly further comprises a cap housing enclosing the protective circuit module.

3. The method as set forth in claim 1, wherein the top cap has at least one fixing groove formed on the top cap such that the top cap and cap subassembly forms the single integrated cap assembly.

4. The method as set forth in claim 1, wherein the at least one connecting member is a separate member or a protrusion formed on the top cap or on the protective circuit module so as to be coupled to the guide groove.

5. The method as set forth in claim 1, wherein the at least one connecting member is electrically connected to the protective circuit module and the top cap.

6. The method as set forth in claim 1, wherein the at least one connecting member is a protruded connecting member integrally formed on a conductive plate of the top cap, and wherein the protective circuit module comprises a substrate having the at least one guide groove coupled to the protruded connecting member.

7. The method as set forth in claim 1, wherein the at least one connecting member comprises first and second independent conductive connecting members, said first independent conductive connecting member being mounted on the top cap while being electrically connected to one of the two electrode terminals, and said second independent conductive connecting member being mounted on the top cap while being electrically connected to the other electrode terminal.

8. The method as set forth in claim 7, wherein the at least one connecting member further comprises rivets connecting the first and second connecting members to the top cap.

9. The method as set forth in claim 1, wherein welding contacts connecting the connecting member and the protective circuit module are formed.

10. The method as set forth in claim 1, wherein a groove are depressed along an outer peripheral surface of the mold at an upper end of the top cap and a ring member is coupled to the groove after assembling the battery can.

11. The method as set forth in claim 10, wherein the mold comprises an indentation at a side of the cap assembly where an electrolyte injection port is positioned, and wherein the ring member is formed with a protrusion coupled to the indentation.

* * * * *